United States Patent
Barthelme et al.

(10) Patent No.: US 9,841,057 B2
(45) Date of Patent: Dec. 12, 2017

(54) BEARING ASSEMBLY

(71) Applicant: AKTIEBOLAGET SKF, Göteborg (SE)

(72) Inventors: Jürgen Barthelme, Frankenwinheim (DE); Alexander Dilje, Schweinfurt (DE); Helmut Hauck, Euerbach (DE); Daniel Ludwig, Gochsheim (DE); Stefanie Seufert, Rothhausen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/033,426

(22) PCT Filed: Oct. 29, 2014

(86) PCT No.: PCT/EP2014/073242
§ 371 (c)(1),
(2) Date: Apr. 29, 2016

(87) PCT Pub. No.: WO2015/063166
PCT Pub. Date: May 7, 2015

(65) Prior Publication Data
US 2016/0258487 A1 Sep. 8, 2016

(30) Foreign Application Priority Data
Oct. 30, 2013 (DE) .................. 10 2013 222 049

(51) Int. Cl.
*F16C 19/24* (2006.01)
*F16C 35/067* (2006.01)
(Continued)

(52) U.S. Cl.
CPC ............ *F16C 35/067* (2013.01); *F16C 19/36* (2013.01); *F16C 35/042* (2013.01);
(Continued)

(58) Field of Classification Search
CPC ...... F16C 35/042; F16C 35/06; F16C 35/067; F16C 35/077
See application file for complete search history.

(56) References Cited

U.S. PATENT DOCUMENTS

| | | | | |
|---|---|---|---|---|
| 2,762,666 A | * | 9/1956 | Potter | F16C 27/04 384/536 |
| 8,052,331 B2 | | 11/2011 | Katougi et al. | |
| 2004/0189124 A1 | * | 9/2004 | Baudelocque | C12N 9/93 310/90.5 |

FOREIGN PATENT DOCUMENTS

| | | |
|---|---|---|
| DE | 965774 C | 6/1957 |
| DE | 60209752 T2 | 11/2006 |

(Continued)

*Primary Examiner* — James Pilkington
(74) *Attorney, Agent, or Firm* — Bryan Peckjian; SKF USA Inc. Patent Dept.

(57) ABSTRACT

A bearing assembly includes a roller bearing connected with a bearing support having a plate-shaped section. The bearing support has a receiving bore for an outer ring of the roller bearing, and the outer ring of the roller bearing is affixed to the bearing support with two affixing plates that are fixed to first and second end sides of the bearing support and that clamp the outer ring at two clamping surfaces. An axial spacing of the first and second end sides of the bearing support is smaller than an axial spacing of the clamping surfaces of the outer ring, and the two affixing plates have a different mechanical strength.

8 Claims, 3 Drawing Sheets

(51) Int. Cl.
*F16C 35/077* (2006.01)
*F16C 19/36* (2006.01)
*F16C 35/04* (2006.01)
*F16C 19/06* (2006.01)

(52) U.S. Cl.
CPC ............ *F16C 35/077* (2013.01); *F16C 19/06* (2013.01); *F16C 2226/50* (2013.01); *F16C 2226/60* (2013.01)

(56) References Cited

FOREIGN PATENT DOCUMENTS

| DE | 102006007012 A1 | 8/2007 |
| DE | 102007040460 A1 | 2/2009 |
| WO | 2008/116443 A1 | 10/2008 |

\* cited by examiner

BEARING ASSEMBLY

CROSS-REFERENCE

This application is the U.S. National Stage of International Application No. PCT/EP2014/073242 filed on Oct. 29, 2014, which claims priority to German patent application no. 10 2013 222 049.9 filed on Oct. 30, 2013.

TECHNOLOGICAL FIELD

The disclosure is directed to a bearing assembly, comprising at least one roller bearing, which is connected with at least one bearing support that is plate-shaped at least in a section thereof. The bearing support has a receiving bore for the outer ring of the roller bearing, and the outer ring of the roller bearing is affixed to the bearing support with two affixing plates that are fixed at the two end sides of the bearing support. The two affixing plates clamp the outer ring at two clamping surfaces, and the spacing, measured in the axial direction, of the end sides of the bearing support is smaller than the spacing, measured in the axial direction, of the clamping surfaces of the outer ring.

BACKGROUND

A bearing assembly of the above-mentioned type is disclosed in DE 602 09 752 T2(family member of US 2004/0189124). DE 10 2007 040 460 A1, U.S. Pat. No. 8,052,331 B2, DE 10 2006 007 012 A1, DE 965 774 B and WO 2008/116443 A1 show similar solutions. In the first reference, a structure of a bearing assembly is proposed, in which the roller bearing to be retained in the bearing support and especially its outer ring is affixed to the bearing support with lateral affixing plates. The two affixing plates are affixed to the bearing support with bolts and fixedly clamp the bearing outer ring to the bearing support. The bearing outer ring is thereby supported on its both sides by the affixing plates; at the same time, the plates are supported on the two end-side surfaces of the plate-shaped bearing support.

So that a static over-determination of the axial retention of the outer ring does not occur, the cooperating surfaces must be exactly tailored to each other. If this is not the case, the bearing can axially migrate despite the two retaining plates, which is not acceptable, because then the axial position of the outer ring relative to the bearing support is not defined in a precise manner. During operation of the assembly, this leads to louder noises and increased wear as a consequence of the not-defined position of a transmission shaft supported by the roller bearing.

It is therefore disadvantageous in the above-described, known solutions that a very high manufacturing effort must be incurred, which makes the manufacture of the bearing support cost-intensive.

Solutions are also known, in which the roller bearing and/or its outer ring is affixed to the bearing support only via a single retaining plate. However, it is disadvantageous that the retention of the bearing on the bearing support is not as stable as in the above-described, known solutions.

SUMMARY

The object underlying the invention is to further develop a bearing support of the above-described type so that, in a simple and thus cost-effective manufacturing manner and for an applicable manufacturing tolerance that is thus present, a defined axial relative position between the outer ring and the bearing support is ensured.

The solution of this object by the invention provides that the two affixing plates have a different mechanical strength.

The ratio of the spacing of the end sides of the bearing support to the spacing of the clamping surfaces of the outer ring preferably amounts to between 0.975 and 0.995.

The two affixing plates are preferably affixed to the bearing support by bolts.

In order to realize the differing mechanical strength of the two affixing plates, various possibilities are provided, of which some are embodied in the following; these can also be used in combination.

The two affixing plates preferably have a different thickness—measured in the axial direction.

They could have different sizes—observed from the axial direction.

Furthermore, they could be composed of different materials.

Further, the two affixing plates could each be composed of a plurality of plate elements that are disposed stacked on each other. In this case, the two affixing plates then have a different number of such plate elements.

In general, a different deformation behavior of the two affixing plates can be achieved by the above mentioned, and also by other, measures:

Differing material strengths, a non-congruent design of the two affixing plates, differing thicknesses of the affixing plates, differing reinforcement elements in the affixing plates, a differing number of individual elements, from which the affixing plates are constructed (e.g., a plurality of different layers of thin sheets), could be provided, so that a different elasto-plastic behavior of the affixing plates is achieved overall in the axial direction.

It is important that, at least in sections of the affixing plates, different mechanical strengths are present.

One of the two affixing plates can be captively connected with the outer ring of the roller bearing. It is preferably provided that this affixing plate is disposed in a groove in an end-side area of the outer ring.

In this regard, preferably it is the affixing plate having the greater mechanical strength that is captively connected with the outer ring of the roller bearing.

Finally, it can be provided that the bolt head of the bolts is disposed on the affixing plate having the lower mechanical strength.

With regard to the clamping surfaces of the bearing outer ring, by which the two affixing plates clamp the outer ring, it is noted that a preferable design provides that they are formed by grooves in the outer ring; then it involves the end-sided surfaces of said groove (this solution possibility is further explained in the following exemplary embodiment). However, it is also possible that such a groove is present only in an axial end area of the bearing ring and the affixing plate on the other axial end of the bearing outer ring clamps it on its end side, which is free of a groove. Finally, it is also possible to completely omit grooves in the bearing outer ring so that, in this case, the affixing plates abut on the end sides of the bearing outer ring and thereby clamp the outer ring.

The bearing support described here as plate-shaped can also be a segment of a wall of a housing, on which or in which the roller bearing is affixed.

The present proposal thus solves the problem of the static over-determination in the affixing of the bearing outer ring on the bearing support, as explained above. A defined axial gap between the affixing plates and the bearing support is provided, which is eliminated upon tightening the affixing bolts, and an intentionally different mechanical strength of the two affixing plates is provided. This has the consequence that, upon tightening the affixing bolts, the bearing outer ring is tightened against a reference structure in an intentional manner, which reference structure is defined by the stiffer of the two affixing plates.

Thus, a static over-determination of the axial bearing fixation can be eliminated in an advantageous manner, wherefore no extremely high manufacturing precisions are necessary, as is the case in the known solutions described in the introduction.

The small manufacturing tolerances, insofar as previously required, at the retaining plates as well as at the bearing outer ring and at the bearing support or wall of the housing are also not necessary, which makes possible a cost-effective manufacturing.

Further, the rejection rate can thus be reduced.

DETAILED DESCRIPTION

Figure 1:
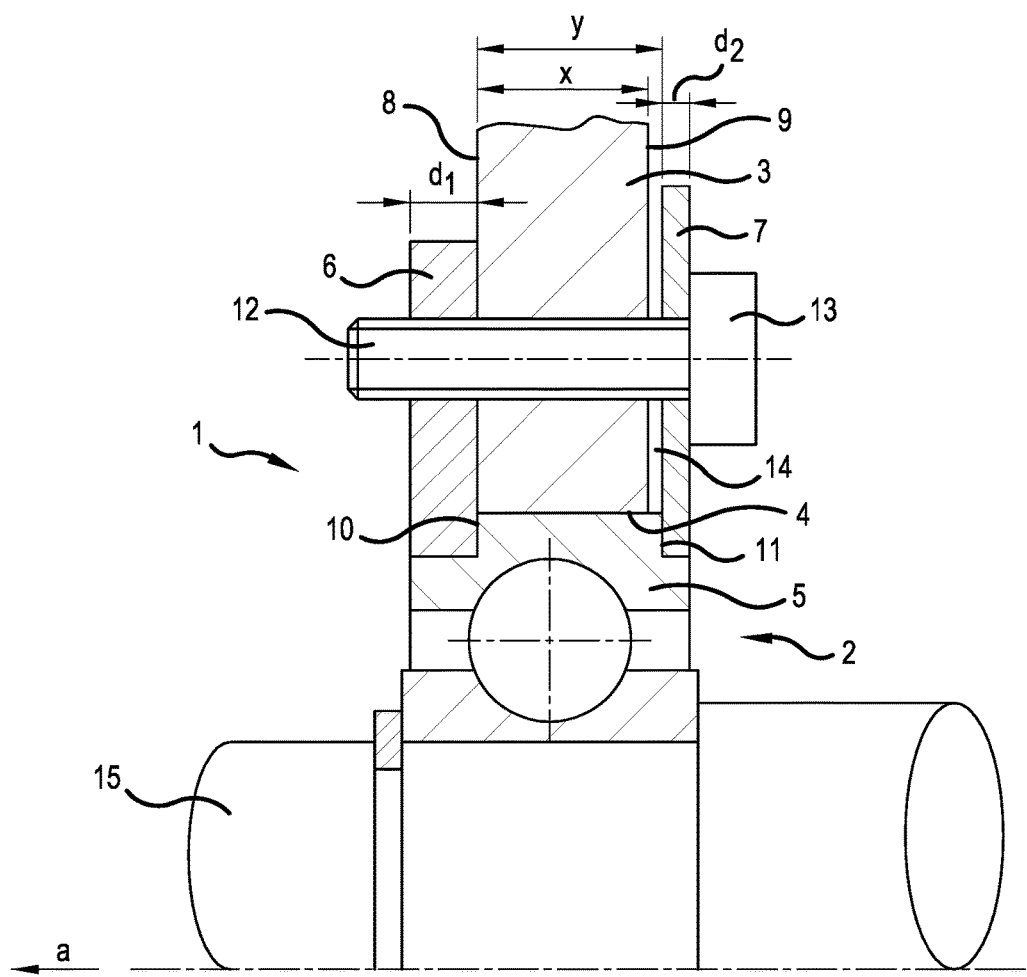
FIG. 1 shows the radial cross-section through a bearing assembly, wherein a roller bearing is held by a bearing support.

A bearing assembly 1 is illustrated in the FIGURE, which comprises a roller bearing 2 that is to be affixed in a bearing support 3. The final mounted state is not illustrated; instead, a mounting state is illustrated before the bolts 12, of which only one is illustrated, are tightened.

The illustrated bearing support 3 has at least the illustrated section, which is formed plate-shaped, with two end sides 8 and 9 that have a spacing X from each other in the axial direction a. The bearing support 3 can be a component that is fitted into a transmission housing; however it can also be a segment of a housing, e.g., of a transmission.

Figure 2:
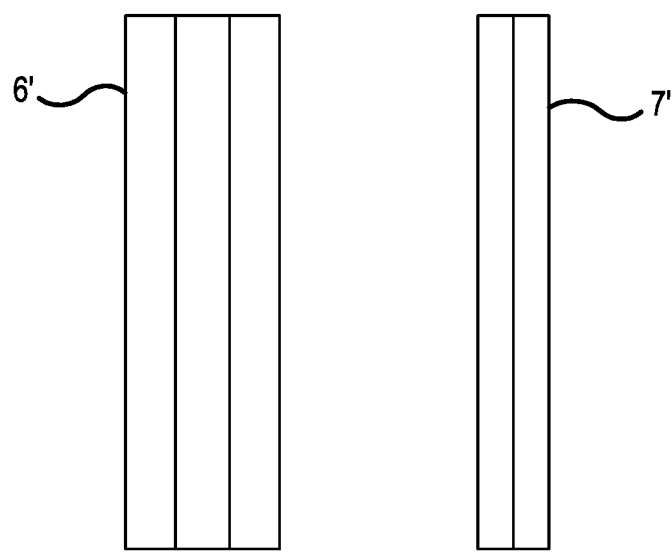
FIG. 2 shows an alternate embodiment of the affixing plates of FIG. 1.

The bearing support 3 has a receiving bore 4 for receiving the outer ring 5 of the roller bearing 2. The outer ring 5 of the roller bearing 2 is pushed into the receiving bore and axially fixed by affixing an affixing plate 6 and 7 to each of the two end sides 8, 9 of the bearing support 3 In an alternate embodiment, illustrated in FIG. 2, two affixing plates 6', 7' could each be composed of a plurality of plate elements that are disposed stacked on each other. In this case, the two affixing plates 6', 7' then have a different number of such plate elements.

Clamping surfaces 10 and 11 are formed on the outer ring 5 in the area of the two end sides of the outer ring 5, which clamping surfaces 10, 11 can be formed—as illustrated—by grooves in the outer ring 5.

If the bolts 12 are inserted into the corresponding through-bores of the bearing support 3 and tightened in the assembled state (the mating thread for the bolts 12 is located in the affixing plate 6), the composite composed of the outer ring 5, bearing support 3 and affixing plates 6, 7 is secured and the roller bearing 2 is thus attached to the bearing support 3.

In that this is possible in a problem-free manner in a statically determined manner and in the presence of manufacturing tolerances, it is provided that the spacing X, measured in the axial direction a, of the end sides 8 and 9 of the bearing support 3 is smaller than the spacing Y, measured in the axial direction a, of the clamping surfaces 10 and 11 of the outer ring 5. Accordingly, an axial gap 14 is initially present —as can be recognized in the Figure —before the bolts 12 are firmly tightened.

In that now a defined axial position of the outer ring 5 relative to the bearing support 3 results upon firmly tightening the bolts 12, it is further provided that the two affixing plates 6 and 7 are intentionally formed differently and thus have a different mechanical strength.

This has the consequence that, upon tightening the bolts 12, the affixing plate having the lower mechanical strength yields more than the other affixing plate, so that the final position of the outer ring 5 relative to the bearing support 3 is defined by the mechanically stronger affixing plate.

In the illustrated exemplary embodiment, it is the right affixing plate 7 that has a lesser mechanical strength as compared to the left affixing plate 6. Accordingly, the left affixing plate 6 defines the relative position of the outer ring 5 to the bearing support 3; the right bearing plate 7 yields accordingly upon tightening of the bolts 12, which occurs through plastic and/or elastic deformation.

As illustrated, the different mechanical strengths can be achieved very easily by selecting the thickness d1 of a one, left affixing plate 6 to be larger than the thickness d2 of the other, right affixing plate 7. The smaller thickness preferably amounts to at most 75%, preferably at most 60%, of the larger thickness. When the different mechanical strengths are provided in a different manner, by forming the left affixing plate 6 and the right affixing plate 7 of different materials, for example, the differences in mechanical strengths should be comparable to the different mechanical strengths provided by using plates of different thicknesses as described above.

Figure 3:
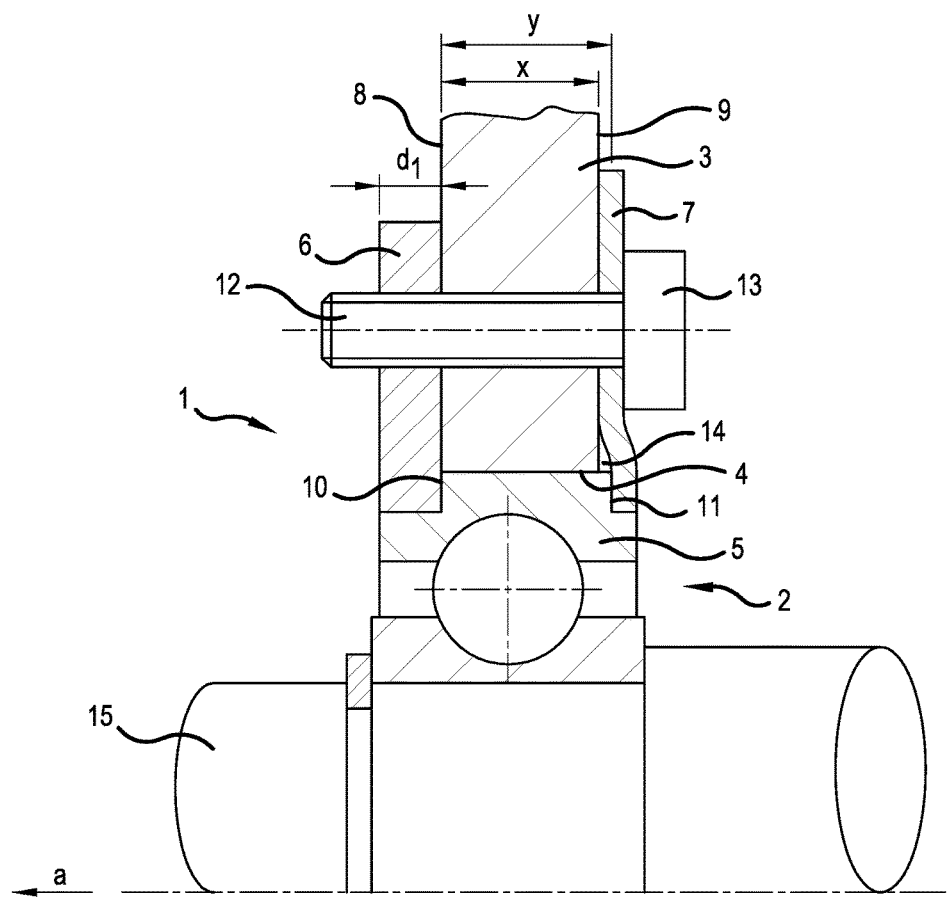
FIG. 3 shows the bearing assembly of FIG. 1 with two affixing plates securing a bearing outer ring to a bearing support.

A reliable securing of the assembly is possible while eliminating the to-be-expected manufacturing tolerences when the ratio of the spacing X of the end sides 8 and 9 of the bearing support 3 to the spacing Y of the clamping surfaces 10 and 11 of the outer rings 5 amounts to between 0.975 and 0.0995. Then it is possible, without expensive measures, to affix the necessary components and neverless to ensure in the assembly that a defined position of the outer rings 5 relative to the bearing support 3 is present when the mounting process is concluded, that is, when the defined axial gap between the affixing plates 6, 7 and the bearing support 3 has been eliminated by tightening the affixing bolts 12 as shown, for example, in FIG. 3.

In the exemplary embodiment, it is provided that the thicker and thus stiffer affixing plate 6 is connected with the roller bearing 2 in a captive-manner. This can be effected by forming the grooves in the left end-side area of the outer ring 5 so that the affixing plate 6 snaps onto the outer ring 5 when axially slid and thus (up to a corresponding removing force) is firmly connected with the outer ring 5.

Further, it is provided that the bolt head 13 of the bolts 12 abuts on the affixing plate 7 having the lower mechanical strength.

Manufacturing tolerances play no large role due to the initially—before the tightening of the bolts—present axial gap 14; these tolerances are compensated and/or absorbed upon tightening the bolts 12 and are specifically eliminated by elastic or also plastic deformation of the affixing plates 6, 7.

When the bearing assembly is mounted, e.g., in a transmission, the roller bearing 2 having the affixing plate 6 captively disposed on it is preferably initially pressed onto the shaft 15 (as illustrated in the FIGURE) and axially fixed. The receiving bore 4 of the bearing support 3 is brought over the outer ring 5 of the roller bearing 2 and is mounted. At this time, the pre-mounted affixing plate 6 contacts the end side 8 of the bearing support 3 in a flush manner so that no axial gap is present here between the affixing plate 6 and the end side 8 of the bearing support 3.

Then the second affixing plate 7 is set into the corresponding groove in the outer ring 5, wherein the axial gap 14 then results. Then the bolts 12 are screwed into the assembly and so that the bolt head 13 abuts on the end side of the mechanically weaker affixing plate 7 (as illustrated in the FIGURE).

Upon simultaneously tightening all of the bolts 12, the fixed composite of the bearing assembly results through an elasto-plastic deformation, primarily of the affixing plate 7 having the lesser stiffness. Accordingly, the position of the outer ring 5 relative to the bearing support 3 remains defined by the affixing plate 6.

REFERENCE NUMBER LIST

1 Bearing assembly
2 Roller bearing
3 Bearing support
4 Receiving bore
5 Outer ring
6 Affixing plate
7 Affixing plate
8 End side
9 End side
10 Clamping surface
11 Clamping surface
12 Bolt
13 Bolt head
14 Axial gap
15 Shaft
a Axial direction
X Spacing of the end sides
Y Spacing of the clamping surfaces
$d_1$ Thickness
$d_2$ Thickness

The invention claimed is:

1. A bearing assembly comprising:
    a bearing support including a plate-shaped section and a receiving bore; and
    a roller bearing having an outer ring connected at the plate-shaped section of the bearing support by a first affixing plate at a first side of the bearing support and a second affixing plate at a second side of the bearing support, the first and second affixing plates clamping the outer ring at a first clamping surface and a second clamping surface of the bearing outer ring,
    wherein an axial width of the plate-shaped section of the bearing support is less than an axial separation of the first and second clamping surfaces of the outer ring, and
    wherein the first affixing plate is more easily deformable than the second affixing plate, and
    including a plurality of threaded fasteners extending through the first affixing plate, the plate-shaped section and the second affixing plate, the plurality of threaded fasteners holding the first affixing plate in contact with the first side of the bearing support and holding the second affixing plate in contact with the second side of the bearing support such that the bearing outer ring is fixed relative to the bearing support by the first and second affixing plates.

2. The bearing assembly according to claim 1, wherein a ratio of the axial width of the plate-shaped section to the axial separation of the first and second clamping surfaces is from 0.975 to 0.995.

3. The bearing assembly according to claim 2, wherein each of the plurality of threaded fasteners has a head, and wherein the heads are in contact with the first affixing plate.

4. The bearing assembly according to claim 1, wherein the second affixing plate has a greater axial width than the first affixing plate.

5. The bearing assembly according to claim 1, wherein the first affixing plate is formed from a first material and the second affixing plate is formed from a second material different than the first material.

6. The bearing assembly according to claim 1, wherein the first affixing plate comprises a first number of stacked plate elements and the second affixing plate comprises a second number of stacked plate elements different than the first number.

7. The bearing assembly according to claim 1, wherein one of the two affixing plates is disposed in a groove in an end-side area of the outer ring.

8. The bearing assembly according to claim 1,
    wherein a ratio of the axial width of the plate-shaped section to the axial separation of the first and second clamping surfaces is from 0.975 to 0.995, and
    wherein the first affixing plate is disposed in a first groove in the outer ring and the second affixing plate is disposed in a second groove in the outer ring, and
    wherein the threaded fasteners have heads and the heads are disposed on the first affixing plate.

* * * * *